Feb. 1, 1966
P. S. SMITH
3,232,689
METHOD AND APPARATUS FOR PREVENTING FALL-OFF IN LIGHT INTENSITY IN PROJECTED IMAGES
Filed March 4, 1963
4 Sheets-Sheet 1

INVENTOR.
PHILIP STANLEY SMITH
BY Eyre, Mann & Lucas
ATTORNEYS

INVENTOR.
PHILIP STANLEY SMITH
BY Eyre, Mann & Lucas
ATTORNEYS

INVENTOR.
PHILIP STANLEY SMITH
BY Eyre, Mann & Lucas
ATTORNEYS

INVENTOR.
PHILIP STANLEY SMITH
BY Eyre, Mann & Lucas
ATTORNEYS

United States Patent Office 3,232,689
Patented Feb. 1, 1966

3,232,689

METHOD AND APPARATUS FOR PREVENTING FALL-OFF IN LIGHT INTENSITY IN PROJECTED IMAGES

Philip Stanley Smith, Cherry Hill, N.J., assignor to Smith-Dieterich Corporation, a corporation of New York Filed Mar. 4, 1963, Ser. No. 262,774
4 Claims. (Cl. 352—41)

The present invention relates to projection of motion picture images on a screen and more particularly to the brightness of such images.

In theatre projection of motion pictures the brightness of the images produced on the screen fall off drastically from the center toward the edges. For instance, when the .868 inch by .735 inch academy aperture is employed in the projection of images from 35 mm. film, the images are one hundred percent brighter in the center than along the side edges and twenty-five percent brighter in the center than at the top and bottom edges. With wide angle systems the variation in brightness between the center and the side edges is even more pronounced and in three panel systems the variation of intensity forms three centers of interest on the screen which distracts the viewer and focuses attention on the overlap areas between the adjacent panels.

The variation in brightness of the images is caused by the variation in intensity of the light beam used in projecting the images on the screen. Normally the light beam is aligned so that the center of the beam or the most intense portion of the beam passes through the center of the film. This results in the projected image being brighter in the center than along the edges.

The present invention proposes to overcome this variation in brightness in either of two ways. The first way is to continually and rapidly move the light beam as by oscillation so that it scans the film. This causes the center or more intense portion of the beam to pass through different parts of the film so that the bright spot appearing on the screen will continually shift instead of remaining static in the center of the projected image. Since the change in position of the bright spot is rapid it is not perceivable by the eye. Instead the eye averages out the light so that the images appear to be uniformly bright from edge to edge. With averaging of the light the picture will not appear as bright. However, this can be easily corrected by increasing the power of the light beam. In conventional systems an increase in the power of the light beam would not be possible because the more intense light rays at the center or "hot spot" of the beam would damage the film. But with the beam moving as in accordance with the present invention, the exposure of any one portion of the film to the hot spot is decreased permitting the increase without endangering the film.

The second way in which the conventional variation in brightness of the images is overcome is to reduce the intensity of the beam at the center until it matches the intensity along the edges. This may most conveniently be done by passing the beam through a graduated neutral filter before it passes through the film. This will of course cut down the brightness of the images. However again the power of the light beam may be increased to compensate for the decrease in brightness. In this case, the power of the beam may be increased because the film damaging hot spot has been eliminated.

A better understanding of the present invention may be had by the following discussion of the particular embodiments of the invention illustrated in the drawings in which.

Figure 1:
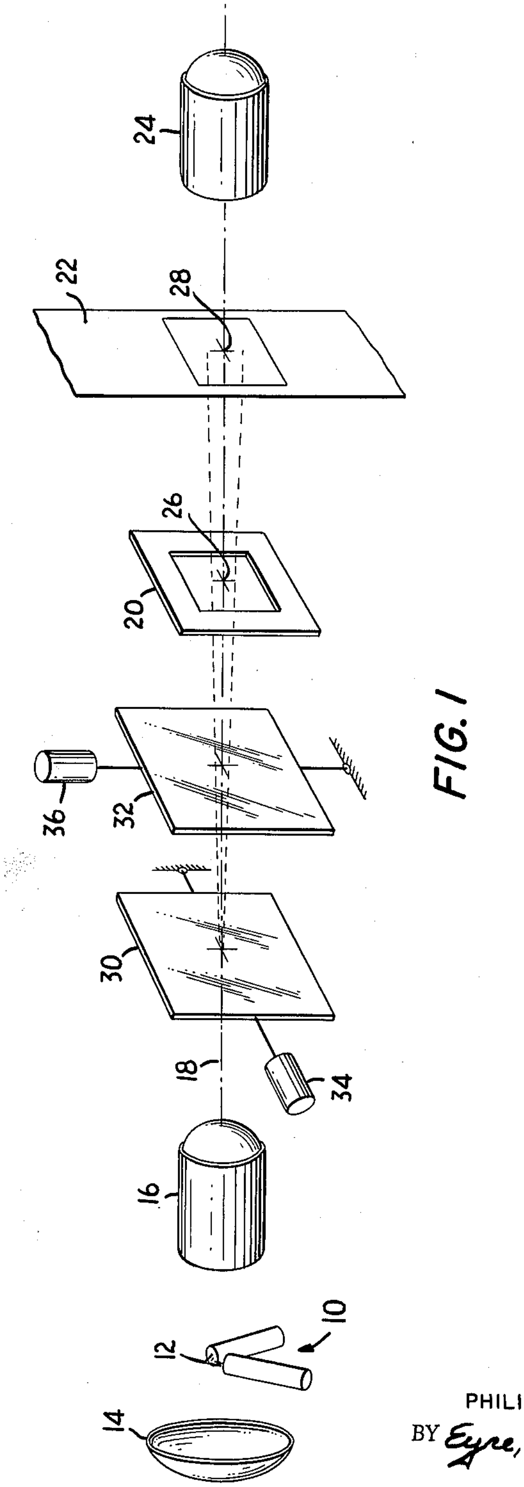
FIG. 1 is a schematic representation of a typical motion picture projector employing oscillating refraction members to move the light beam in accordance with the present invention.

In FIG. 1 a typical motion picture projector is illustrated schematically. This projector has a set of carbon electrodes 10 which are supplied with electrical energy and arranged in the usual manner to produce an arc 12. Light from this arc is reflected from a parabolic reflector 14 and directed into a condensing lens 16 which forms the light into beam 18. This light beam 18 passes through the open sector 20 of the projector shutter mechanism, the frame of film 22 and then through the image forming projection lens 24 which projects the picture on to a screen. The shutter mechanism and other portions of the projector have not been illustrated since they can be any of the well known types and are not necessary for understanding the present invention.

With such a projector it is the general practice in movie theatres to adjust the light beam 18 so that it is coaxial with the optical axis of the projector. This means the center of the beam 18 passes through the center 26 of the open sector 20 and the center 28 of the frame of the film 22.

The beam 18 is not uniform. The intensity of the beam falls off as the distance from its center increases. This means that the light hitting the film is not uniform but has a "hot spot" which is positioned at the center of the film. Therefore the brightness of the image produced by the projection lens 24 decreases on the screen as the distance from the center of the image increases.

To minimize this nonuniformity of brightness of the projected images, the projector, in accordance with the present invention, is provided with two pieces of optically flat glass 30 and 32. The first piece of optically flat glass 30 is free to pivot and oscillate around a horizontal axis passing through the optical center of the projector and the second piece of optically flat glass 32 is free to pivot and oscillate around a vertical axis passing through the optical center of the projector. With the beam 18 aligned with the optical axis of the projector and the optically flat glass pieces arranged perpendicular to the optical axis, the beam passes through the glass pieces at right angles and therefore its path is unaffected by the flat glass pieces. However, if either glass piece is arranged at some angle other than 90° to the beam, the beam as it passes through the glass, is refracted causing it to change its path. For instance, suppose that plate 30 is tipped slightly away from 90° with the beam 18, then the beam 18 will be refracted so that the center of the beam will end up passing through the film frame either above or below the center of the frame. Likewise, if glass piece 32 is tipped away from being perpendicular to the beam, the beam will be refracted so that the center of the beam will end up passing through the film frame either above or below the center of the frame.

Therefore it can be seen that the hot spot of the beam may be positioned to pass through any desired point of the exposed frame of the film 22 by so positioning the glass pieces as to bend the light beam. For this purpose the optically flat glass pieces are driven by motor synchros 34 and 36 respectively. These motor synchros are controlled to oscillate the plates rapidly through the desired excursion so that the hot spot of the beam 18 will systematically scan the exposed frame at a rapid rate. The movement of the beam and scattering of the light is so rapid that changes in the brightness at any given point are not perceivable by eye. Instead the eye averages out the light so that the picture will appear to be uniformly bright from edge to edge.

With averaging out of the light the picture will not appear as bright as if the light beam remained static at the center. However the brightness can be increased by increasing the intensity of the light beam.

Figure 2:
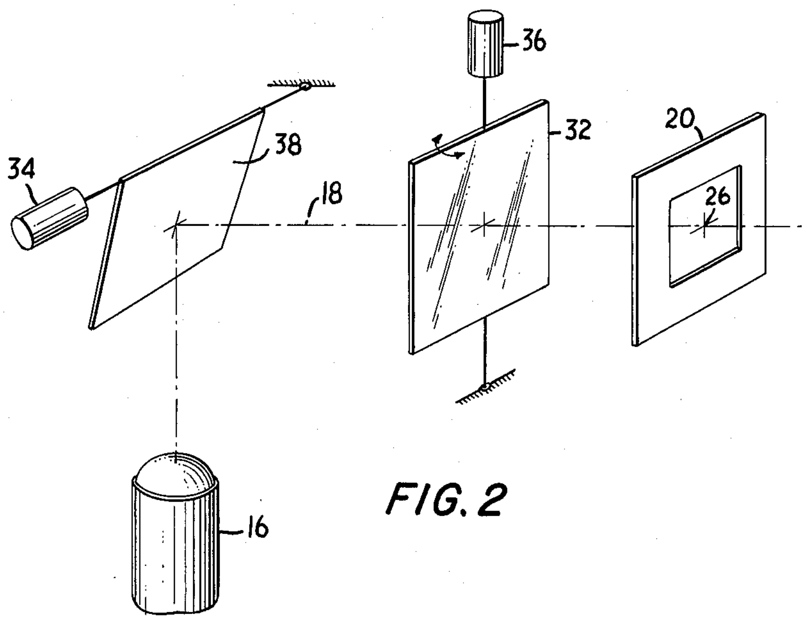
FIG. 2 is a schematic diagram of a combination of a reflecting and a refraction member which may be used in place of the refraction members of FIG. 1 to move the light beam in accordance with the present invention.
Figure 3:
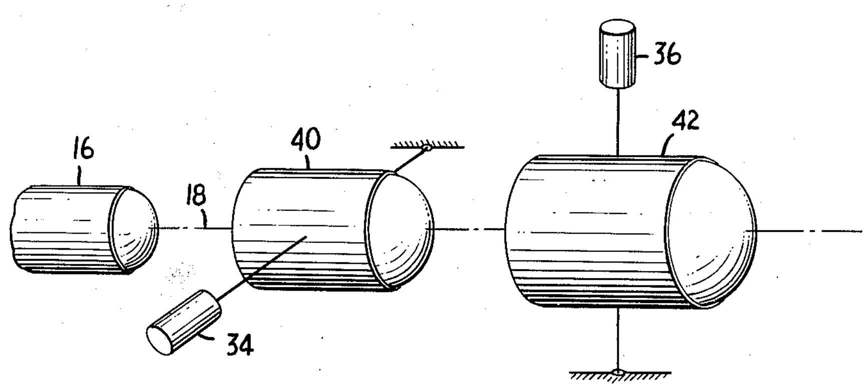
FIG. 3 is a schematic representation of a vibrating lens which can be used in place of the refraction members shown in FIG. 1 to move the beam in accordance with the present invention.

The use of oscillating refracting members is not the only way in which the path of the beam may be altered and scattered. For instance, oscillating reflecting surfaces pivoted at one side as illustrated at 38 in FIG. 2 or vibrating collecting lenses as illustrated at 40 and 42 in FIG. 3 may be substituted for one or both of the refracting members illustrated in FIG. 1.

Figure 4:
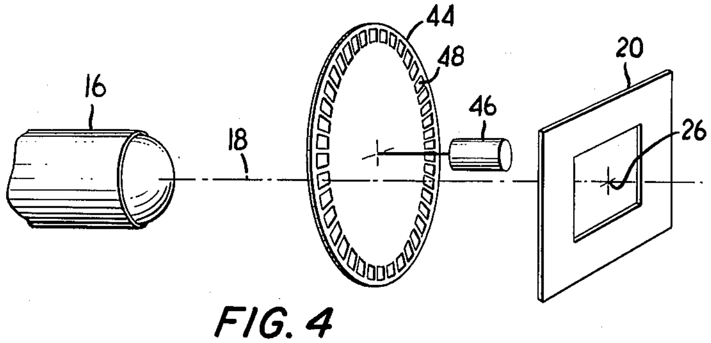
FIG. 4 is a schematic representation of a disc with refracting members arranged at various angles around its periphery which may be used in place of the refraction members of FIG. 1 to move the light beam in accordance with the present invention.

If very fast scanning rates are desired the disc 44 shown in FIG. 4 which is rotated rapidly by a motor 46 may be substituted for the refraction members 30 and 32 of FIG. 1. This disc has a number of apertures 48 around its periphery. In each of the apertures there is a piece of optically flat glass. Each piece of optically flat glass is oriented differently with respect to the incident beam 18 so that as the wheel rotates the beam 18 will be bent at a different angle for each piece of glass in the peripheral apertures. With this arrangement the pieces of glass are arranged so that the beam 18 will systematically scan the film frame.

Figure 5:
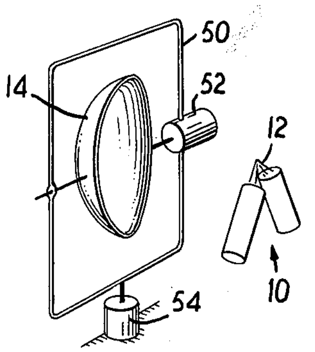
FIG. 5 is a schematic diagram of an oscillating reflector which may be used in place of the reflector and the refraction members shown in FIG. 1 to move the light beam in accordance with the present invention.
Figure 6:
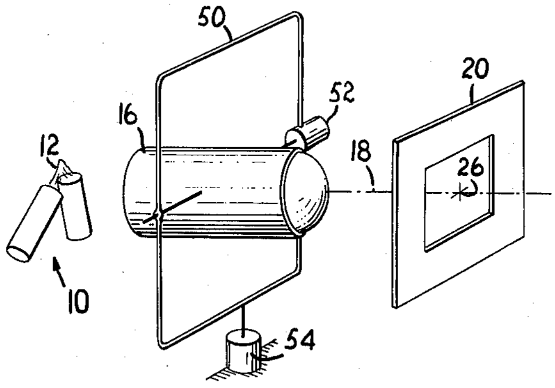
FIG. 6 is a schematic diagram of an oscillating collecting lens which may be used in place of the collecting lens and the refraction members shown in FIG. 1 to move the light beam in accordance with the present invention.

To minimize the parts used in the system the parabolic reflector illustrated in FIG. 5 may be used instead of the optically flat glass pieces 30 and 32 as the means to change the path of the beam. With this arrangement the reflector 14 is positioned in a 2 degrees of freedom gimble 50 and is rapidly oscillated around two axis by synchros 52 and 54. Also, instead of mounting the reflector 14 in the gimble the collecting lens 16 could be mounted in a gimble as illustrated in FIG. 6. In this case the orientation of the collecting lens is changed systematically by synchros 52 and 54 to provide the scanning by the light beam 18.

Described above are a number of ways in which the present invention may be carried out by the movement of the light beam 18.

Figure 7:
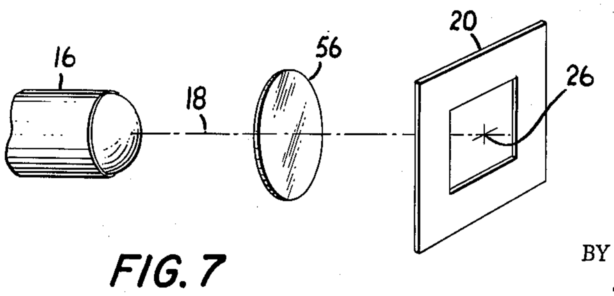
FIG. 7 is a schematic presentation of a variable density filter which can be used to reduce the hot spot of the light beam of the projector of FIG. 1 in accordance with the present invention; and FIG. 8

As shown in FIG. 7, it possible to carry out the present invention with a static beam. This involves the use of a graduated neutral filter 56 positioned in the path of the beam to reduce the intensity of the beam at its center to equal that at the edges of the beam. With such an arrangement, the brightness of the picture is reduced drastically because of the absorbtion of the light by the filter. This can be overcome by increasing the power of the light source. Such an increase is permissible because the damage causing hot spot has been eliminated.

Figure 8:
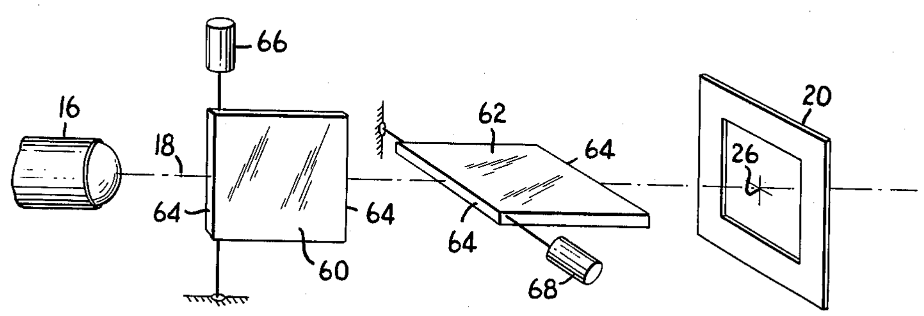

In the modified form of invention illustrated in FIG. 8 reflecting surfaces are employed in place of the refracting members 30 and 32 of FIG. 1. The reflecting surfaces 60 and 62 comprise flat pieces of optical glass having a mirror coating on opposite sides thereof. The edges 64 of both members which are positioned in the beam of light 18 are preferably given an optical quality polish so that the light may pass through the glass without any apparent distortion. Member 60 is mounted with its mirror surfaces in vertical planes and this member is oscillated in horizontal direction by the synchro 66 mounted at one edge thereof so that the beam of light will be reflected from the mirror surfaces to scan the film frame in horizontal direction. Member 62 is mounted with its mirror surfaces in horizontal planes and this member is oscillated in a vertical direction by the synchro 68 mounted at one edge thereof so that the beam of light will be reflected from the mirror surfaces to scan the film frame in vertical direction when the member oscillates.

Figure 9:
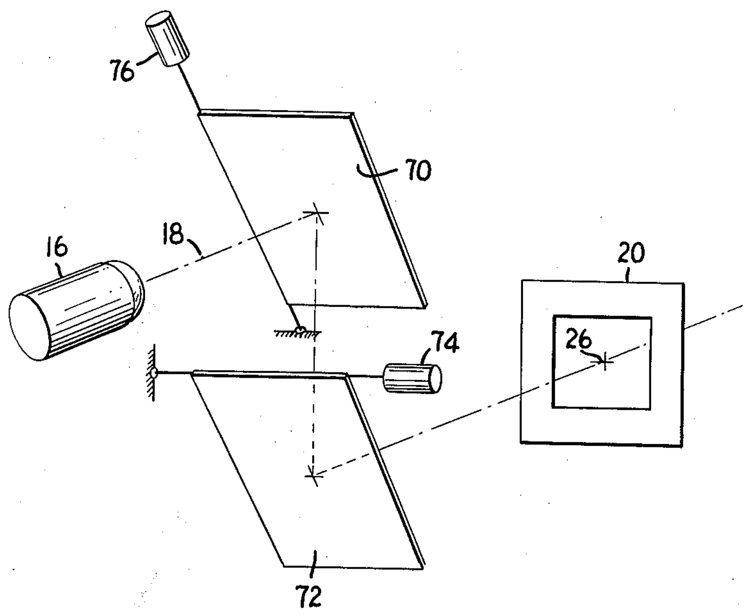
FIG. 9 illustrates modified forms of reflecting members used in accordance with the present invention.

In the modified form of invention illustrated in FIG. 9 reflecting surfaces 70 and 72 are employed in place of the refracting members 30 and 32 of FIG. 1. In this case members 70 and 72 are stainless steel mirrors or any other convenient form of mirror.

As illustrated in FIG. 9 the reflecting surface 70 is positioned in a vertical plane so that the mirror intercepts the beam of light 18 at an angle of approximately forty-five degrees and the light reflected from mirror 70 is directed toward the second mirror 72 which also intercepts the beam of reflected light on an angle of approximately forty-five degrees. The light reflected from mirror 72 passes through the open sector of the projection shutter mechanism (not shown), the frame of film (not shown) and then through the image projection lens (not shown). The light beam is caused to scan the film frame in horizontal direction by oscillating mirror 70 in a horizontal direction by means of the synchro 74 and the reflected light beam is caused to scan the film frame in vertical direction by oscillating the mirror 72 in a vertical direction by means of the synchro 76.

Obviously, it will be understood that this is intended to cover all changes and modifications of the embodiments of the invention herein chosen for the purpose of illustration which do not depart from the spirit and scope of the invention.

I claim:

1. In the projection of motion pictures from film transparencies with a motion picture projector which directs a light beam through the film transparencies and through an image forming lens to reproduce on a screen the scenes on the transparencies, a method for minimizing the fall off in light intensity from the center to the edges of each scene so reproduced comprising moving the center of the light beam in a path across each of the transparencies by rapidly and continuously deflecting the light beam so that the movement of the light beam is imperceptible to viewers of the reproduced images while at the same time decreasing the mentioned fall off in light intensity perceived by said viewers.

2. In the projection of motion pictures from film transparencies with a motion picture projector which directs a light beam through the film transparencies and through an image forming lens to reproduce on a screen the scenes on the transparencies, a method for minimizing the fall off in light intensity from the center to the edges of each scene so reproduced, comprising moving the center of the light beam in a path across each of the transparencies by rapidly and continuously deflecting the light beam at some point in its path to the film transparency so that the movement of the light beam is imperceptible to viewers of the reproduced images while at the same time decreasing the mentioned fall off in light intensity perceived by said viewers, and increasing the intensity of the light beam to compensate for the decrease in light intensity on the screen resulting from the moving of the light beam.

3. The method of claim 2 including moving the light beam so as to subject substantially the entire area of each transparency to the central area of the light beam.

4. In a motion picture projector which directs a light beam from a light source through film transparencies and through an image forming lens to reproduce on a screen the scenes on the transparencies, means for minimizing the fall off in light intensity of each scene towards its edges comprising light deflection means positioned in the path of the light beam between the light source and the film transparencies for deflecting the light and motive means driving said light deflection means rapidly for the deflection of the light beam in a path across each of the transparencies thereby decreasing the mentioned fall off in light intensity perceived by viewers of the projected motion pictures.

References Cited by the Examiner

UNITED STATES PATENTS

| | | | |
|---|---|---|---|
| 2,227,054 | 12/1940 | Bedford | 352—109 |
| 2,588,373 | 3/1952 | Erban | 88—57 X |
| 3,016,785 | 1/1962 | Kapany | 88—1 |

FOREIGN PATENTS

| | | |
|---|---|---|
| 536,396 | 5/1941 | Great Britain. |

NORTON ANSHER, *Primary Examiner.*

WILLIAM MISIEK, *Examiner.*